(12) United States Patent
Pow

(10) Patent No.: US 11,879,726 B2
(45) Date of Patent: *Jan. 23, 2024

(54) METHOD AND APPARATUS FOR REPAIRING TRUCK AND TRAILER AXLES

(71) Applicant: Mobalign Franchising Inc., Nanaimo (CA)

(72) Inventor: Lee John Pow, Nanaimo (CA)

(73) Assignee: Mobalign Franchising Inc., Nanaimo (CA)

( * ) Notice: Subject to any disclaimer, the term of this patent is extended or adjusted under 35 U.S.C. 154(b) by 0 days.

This patent is subject to a terminal disclaimer.

(21) Appl. No.: 18/113,042

(22) Filed: Feb. 22, 2023

(65) Prior Publication Data

US 2023/0273004 A1 Aug. 31, 2023

Related U.S. Application Data

(63) Continuation of application No. 17/520,045, filed on Nov. 5, 2021, now Pat. No. 11,609,081.

(60) Provisional application No. 63/117,136, filed on Nov. 23, 2020.

(51) Int. Cl.
*G01B 5/25* (2006.01)
*B60S 5/00* (2006.01)

(52) U.S. Cl.
CPC . *G01B 5/25* (2013.01); *B60S 5/00* (2013.01)

(58) Field of Classification Search
CPC ..................................... G01B 5/25; B60S 5/00
See application file for complete search history.

(56) References Cited

U.S. PATENT DOCUMENTS

| 4,792,080 | A | 12/1988 | Ferrari |
| 5,125,146 | A | 6/1992 | Ferrari |
| 7,467,473 | B2 | 12/2008 | Tarrill et al. |
| 7,877,884 | B2 | 2/2011 | Harrill et al. |
| 9,494,421 | B2 | 11/2016 | McClenahan et al. |
| 9,687,941 | B2 | 6/2017 | McClure |
| 9,964,394 | B2 | 5/2018 | Andersson et al. |
| 10,717,160 | B2 | 7/2020 | Ferrari |
| 11,609,081 | B2 * | 3/2023 | Pow .......................... G01B 5/25 |
| 2006/0143893 | A1 | 7/2006 | Ebert |
| 2012/0319365 | A1 | 12/2012 | Grobbel et al. |
| 2017/0028517 | A1 | 2/2017 | Ferrari |
| 2020/0124409 | A1 | 4/2020 | Jozokos |
| 2022/0163310 | A1 | 5/2022 | Pow |
| 2023/0273004 | A1 * | 8/2023 | Pow .......................... G01B 5/25 33/193 |

* cited by examiner

*Primary Examiner* — Yaritza Guadalupe-McCall
(74) *Attorney, Agent, or Firm* — Todd A. Rattray; Oyen Wiggs Green & Mutala LLP

(57) ABSTRACT

An alignment apparatus for accurately aligning a replacement spindle with a pre-existing axle shaft to facilitate repairing a damaged axle assembly. The alignment apparatus may comprise an axle clamp assembly and a spindle clamp assembly. The axle clamp assembly may be mountable to an axle shaft. The axle clamp assembly may be self-centering and self-aligning. Similarly, the spindle clamp assembly may be mountable to a spindle. The spindle clamp assembly may be self-centering and self-aligning. The axle clamp assembly may be fixable to the spindle clamp assembly. By fixing the axle clamp assembly to the spindle clamp assembly, a desired alignment between the axle shaft and the spindle may be achieved.

20 Claims, 8 Drawing Sheets

METHOD AND APPARATUS FOR REPAIRING TRUCK AND TRAILER AXLES

REFERENCE TO RELATED APPLICATIONS

This application is a continuation of U.S. application Ser. No. 17/520,045 filed 5 Nov. 2021 which in turn claims priority from, and the benefit of 35 USC 119 in relation to, U.S. application No. 63/117,136 filed 23 Nov. 2020. All of the applications referred to in this paragraph are hereby incorporated herein by reference.

TECHNICAL FIELD

This invention relates generally to methods and apparatus for repairing truck and trailer axle assemblies and in particular to methods and apparatus for replacing a spindle end of a truck or trailer axle assembly.

BACKGROUND

A vehicle may comprise one or more axle assemblies upon which its wheels are mounted. Each axle assembly may comprise an axle shaft and one or more spindles that protrude from the transverse end(s) of the axle shaft. Wheels may be rotatably mounted to each spindle.

FIG. 1 shows an exemplary, non-limiting schematic diagram of a prior art axle assembly 10. Axle assembly 10 comprises an axle shaft 12, a first spindle 14-1 and a second spindle 14-2 (generically referred to as a spindle 14 and collectively referred to as spindles 14).

In some cases, a brake flange (or brake spider) 16 may be attached to axle shaft 12 to facilitate mounting one or more components of the vehicle's brakes.

A semi-trailer truck (also commonly referred to as a tractor-trailer truck) may comprise one or more drive axle assemblies on the tractor portion of the truck and one or more trailer axle assemblies on the trailer portion of the truck.

Often, when a semi-trailer truck has a bearing or axle shaft failure or sometimes where a semi-trailer truck is in an accident, the weight of the truck/trailer can cause major damage to drive and/or trailer axle assemblies. In particular, it is common for one or more spindles of an axle assembly to be damaged. While a damaged spindle can be repaired or replaced using known techniques and tools, there remains a desire to replace a damaged spindle without having to remove the axle assembly from the truck. There remains a desire to accurately align a replacement spindle without having to remove the axle assembly from the truck. There remains a desire for a method and tools to allow a single person to replace a damaged spindle quickly and conveniently. There remains a desire to replace damaged spindles at the location of the truck/trailer at the location where the failure happens or is otherwise observed.

The foregoing examples of the related art and limitations related thereto are intended to be illustrative and not exclusive. Other limitations of the related art will become apparent to those of skill in the art upon a reading of the specification and a study of the drawings.

SUMMARY

The following embodiments and aspects thereof are described and illustrated in conjunction with systems, tools and methods which are meant to be exemplary and illustrative, not limiting in scope. In various embodiments, one or more of the above-described problems have been reduced or eliminated, while other embodiments are directed to other improvements.

One aspect of the invention provides a vehicular axle alignment apparatus for aligning a first axle component with a second axle component. The alignment apparatus comprises an axle clamp assembly. The axle clamp assembly comprises an axle chuck body defining an axle opening for receiving the first axle component extending in a first axial direction therethough, an axle clamping mechanism comprising an axle moveable element and three or more axle jaws. The three or more axle jaws are angularly spaced apart about an axle axis that extends through a center of the axle opening in the first axial direction. The three or more axle jaws are moveably coupled to the axle moveable element such that movement of the axle moveable element relative to the axle chuck body causes corresponding movement of the three or more axle jaws relative to the axle chuck body in corresponding directions toward or away from the axle axis. The vehicular axle alignment apparatus comprises a spindle clamp assembly. The spindle clamp assembly comprises a spindle chuck body defining a spindle opening for receiving the second axle component extending in a second axial direction therethough and a spindle clamping mechanism comprising a spindle moveable element and three or more spindle jaws. The three or more spindle jaws are angularly spaced apart about a spindle axis that extends through a center of the spindle opening in the second axial direction. The three or more spindle jaws are moveably coupled to the spindle moveable element such that movement of the spindle moveable element relative to the spindle chuck body causes corresponding movement of the three or more spindle jaws relative to the spindle chuck body in corresponding directions toward or away from the spindle axis. A plurality of alignment rods extend from one of the axle clamp assembly and the spindle clamp assembly and are releasably coupleable to the other one of the axle clamp assembly and the spindle clamp assembly at corresponding locations spaced apart from the axle axis and the spindle axis such that when the alignment rods are coupled at the corresponding locations, the axle axis and the spindle axis are aligned to be coaxial along a common axis and the alignment rods extend between the axle clamp assembly and the spindle clamp assembly in directions parallel to the common axis.

In some embodiments, the first axle element is a portion of a vehicle axle attached to a vehicle and the portion of the vehicle axle is extendible through the axle opening in the first axial direction while the vehicle axle is attached to the vehicle.

In some embodiments, an amount of the movement of each of the three or more axle jaws in response to a given movement of the axle moveable element is substantially equal. In some embodiments, an amount of the movement of each of the three or more spindle jaws in response to a given movement of the spindle moveable element is substantially equal.

In some embodiments, the three or more axle jaws are moveably coupled to the axle movable element, such that movement of the axle movable element causes corresponding movement of the three or more axle jaws in corresponding radial directions toward or away from the axle axis. In some embodiments, the three or more spindle jaws are moveably coupled to the spindle movable element, such that movement of the spindle movable element causes corresponding movement of the three or more spindle jaws in corresponding radial directions toward or away from the spindle axis. In some embodiments, the three or more axle jaws are slidably received in corresponding axle jaw slots defined by the axle chuck body to allow movement of the three or more axle jaws in corresponding radial directions toward or away from the axle axis. In some embodiments, the three or more spindle jaws are slidably received in corresponding spindle jaw slots defined by the spindle chuck body to allow movement of the three or more spindle jaws in corresponding radial directions toward or away from the spindle axis.

In some embodiments, one of the three or more axle jaws and the corresponding axle jaw slots comprise first tracks for receiving corresponding first rails of the other one of the three or more axle jaws and the corresponding axle jaw slots, wherein interaction of the first tracks with the first rails prevents movement of the three or more axle jaws in directions other than their corresponding radial directions toward or away from the axle axis. In some embodiments, one of the three or more spindle jaws and the corresponding spindle jaw slots comprise second tracks for receiving corresponding second rails of the other one of the three or more spindle jaws and the corresponding spindle jaw slots, wherein interaction of the second tracks with the second rails prevents movement of the three or more spindle jaws in directions other than their corresponding radial directions toward or away from the spindle axis.

In some embodiments, the three or more axle jaws are equally angularly spaced apart about the axle axis. In some embodiments, the three or more spindle jaws are equally angularly spaced apart about the spindle axis.

In some embodiments, the axle moveable element comprises an axle ring defining an axle spirally shaped clamping track, each of the three or more axle jaws comprise one or more axle jaw teeth engaged with the axle spirally shaped clamping track and when the axle ring is pivoted about the axle axis, interaction between the axle spirally shaped clamping track and the one or more axle jaw teeth of the three or more axle jaws cause the movement of the three or more axle jaws in corresponding directions toward or away from the axle axis.

In some embodiments, sufficient movement of the three or more axle jaws in corresponding directions toward the axle axis cause the three or more axle jaws to clamp the first axle component between the three or more axle jaws.

In some embodiments, the spindle moveable element comprises a spindle ring defining a spindle spirally shaped clamping track, each of the three or more spindle jaws comprise one or more spindle jaw teeth engaged with the spindle spirally shaped clamping track, and when the spindle ring is pivoted about the spindle axis, interaction between the spindle spirally shaped clamping track and the one or more spindle jaw teeth of the three or more spindle jaws cause the movement of the three or more spindle jaws in corresponding directions toward or away from the spindle axis.

In some embodiments, sufficient movement of the three or more spindle jaws in corresponding directions toward the spindle axis cause the three or more spindle jaws to clamp the second axle component between the three or more spindle jaws.

In some embodiments, the movement of each of the three or more axle jaws in response to a given movement of the axle moveable element is substantially simultaneous. In some embodiments, the movement of each of the three or more spindle jaws in response to a given movement of the spindle moveable element is substantially simultaneous.

In some embodiments, the axle chuck body is shaped to define three or more apertures, through which the axle spirally shaped clamping track of the axle ring engages the one or more axle jaw teeth of the three or more axle jaws. In some embodiments, the spindle chuck body is shaped to define three or more apertures, through which the spindle spirally shaped clamping track of the spindle ring engages the one or more spindle jaw teeth of the three or more spindle jaws.

In some embodiments, the releasable couplings between the plurality of alignment rods and the other one of the axle clamp assembly and the spindle clamp assembly comprise coupling mechanisms that are convertible between: a first coupled state where the axle axis and the spindle axis are maintained to be coaxial along the common axis, the alignment rods extend between the axle clamp assembly and the spindle clamp assembly in directions parallel to the common axis and a distance between the axle clamp assembly and the spindle clamp assembly is adjustable in a direction parallel to the common axis; and a second coupled state where the axle axis and the spindle axis are maintained to be coaxial along the common axis, the alignment rods extend between the axle clamp assembly and the spindle clamp assembly in directions parallel to the common axis and the distance between the axle clamp assembly and the spindle clamp assembly in the direction parallel to the common axis is fixed. In some embodiments, in the first coupled state, each of the alignment rods protrudes through a bore defined by a corresponding receiver at one of the corresponding locations on the other one of the axle clamp assembly and the spindle clamp assembly, the bore extending in one of the directions parallel to the common axis. In some embodiments, in the second coupled state, a coupling element protrudes into the bore of each receiver to bear against the alignment rod and to thereby prevent movement of the alignment rod through the bore in the one of the directions parallel to the common axis.

Another aspect of the invention provides a method for aligning a first vehicular axle component with a second vehicular axle component. The method comprises clamping an axle clamp assembly to an outer circumferential surface of the first vehicular axle component using an axle clamping mechanism comprising three or more axle jaws that are caused by the axle clamping mechanism to apply substantially simultaneous and equal force against the first vehicular axle component, clamping a spindle clamp assembly to an outer circumferential surface of the second vehicular axle component using a spindle clamping mechanism comprising three or more spindle jaws that are caused by the spindle clamping mechanism to apply substantially simultaneous and equal force against the second vehicular axle component and releasably coupling the axle clamp assembly to the spindle clamp assembly to thereby align the first vehicular axle component and the second vehicular axle component with one another along a common axis.

Another aspect of the invention provides a method of using the vehicular axle alignment apparatus. The method comprises inserting the first axle component through the axle opening, moving the axle movable element to thereby cause the three or more axle jaws to move toward the axle axis and into contact with the first axle component, inserting the second axle component through the spindle opening, moving the spindle movable element to thereby cause the three or more spindle jaws to move toward the spindle axis and into contact with the second axle component, and coupling the plurality of alignment rods to the other one of the axle clamp assembly and the spindle clamp assembly to thereby align the first and second axle components along the common axis.

In some embodiments, after coupling the plurality of alignment rods to the other one of the axle clamp assembly and the spindle clamp assembly, welding the first and second axle components to one another.

Another aspect of the invention provides a spindle alignment apparatus for aligning a replacement spindle with a pre-existing axle. The apparatus comprises an axle clamp assembly comprising: a first chuck body defining a first opening for receiving an axle shaft; and a first spiral clamping ring defining a first spiral clamping track. The apparatus comprises three or more first jaws, each first jaw comprising one or more first teeth engaged with the first spiral clamping track; and two or more alignment rods protruding from the axle clamp assembly; wherein interaction between the first spiral clamping track and the one or more first teeth upon rotation of the first spiral clamping ring causes radial direction movement of each of the three or more first jaws into the first opening to clamp the axle shaft between the three or more first jaws. The apparatus comprises a spindle clamp assembly comprising: a second chuck body defining a second opening for receiving the replacement spindle; a second spiral clamping ring defining a second spiral clamping track. The apparatus comprises: three or more second jaws, each second jaw comprising one or more second teeth engaged with the second spiral clamping track; two or more receivers for slidably receiving the two or more alignment rods; and a set screw for clamping one of the two or more alignment rods within a corresponding one of the two or more receivers to prevent movement between the axle clamp assembly and the spindle clamp assembly; wherein interaction between the second spiral clamping track and the one or more second teeth upon rotation of the second spiral clamping ring causes radial direction movement of each of the three or more second jaws into the second opening to clamp the replacement spindle between the three or more second jaws.

The two or more alignment rods may protrude from the first chuck body.

The two or more alignment rods may protrude from a first surface of the first chuck body orthogonally to the first surface of the first chuck body.

The two or more alignment rods may protrude from a plate. The plate may be attached to the first chuck body.

The three or more first jaws may be slidably received with corresponding first slots defined by the first chuck body to allow radial direction motion of each of the three or more first jaws toward and away from the first opening.

The first jaws may each comprise first tracks for receiving first rails of the corresponding first slots, wherein interaction of the first tracks with the first trails prevent non-radial direction movement of the first jaws.

Interaction between the first spiral clamping track and the one or more first teeth upon rotation of the first spiral clamping ring may cause simultaneous radial direction movement of each of the three or more first jaws into the first opening to clamp the axle shaft between the three or more first jaws Interaction between the first spiral clamping track and the one or more first teeth upon rotation of the first spiral clamping ring may cause equal magnitude radial direction movement of each of the three or more first jaws into the first opening to clamp the axle shaft between the three or more first jaws.

Interaction between the second spiral clamping track and the one or more second teeth upon rotation of the second spiral clamping ring may cause simultaneous radial direction movement of each of the three or more second jaws into the second opening to clamp the replacement spindle between the three or more second jaws.

Interaction between the second spiral clamping track and the one or more second teeth upon rotation of the second spiral clamping ring may cause equal magnitude radial direction movement of each of the three or more second jaws into the second opening to clamp the replacement spindle between the three or more second jaws.

The first spiral clamping track may protrude into each of the three or more first slots through corresponding first apertures defined by the first chuck body to allow the interaction between the first spiral clamping track and the one or more first teeth.

The second spiral clamping track may protrude into each of the three or more second slots through corresponding second apertures defined by the second chuck body to allow the interaction between the second spiral clamping track and the one or more second teeth.

The first spiral clamping ring may be at least partially received within an annular recess defined by a second side of the first chuck body.

The first spiral clamping ring may be held at least partially within an annular recess defined by a second side of the first chuck body by a first plate. The two or more alignment rods may protrude from the first plate and the first plate may be attached to the first chuck body.

The first spiral clamping ring may comprise a first handle to facilitate rotation of the first spiral clamping ring.

The spindle clamp assembly may comprise a second handle to facilitate rotation of the second spiral clamping ring. The second handle may be releasably attachable to the second spiral clamping ring.

The three or more first jaws may be equidistantly circumferentially spaced apart around the first opening. The three or more second jaws may be equidistantly circumferentially spaced apart around the second opening.

Another aspect of the invention provides a method for aligning a replacement spindle with a pre-existing axle. The method comprises: clamping an axle clamp assembly to an outer circumferential surface of a brake flange of the pre-existing axle; clamping a spindle clamp assembly to the replacement spindle; and releasably attaching the axle clamp assembly to the spindle clamp assembly to thereby align the replacement spindle with the pre-existing axle.

Another aspect of the invention provides a method for employing the spindle alignment apparatus. The method comprises: inserting the pre-existing axle into the first opening; rotating the first spiral clamping ring to thereby cause the three or more first jaws to move radially inwardly into contact with the pre-existing axle; inserting the replacement spindle into the second opening; rotating the second spiral clamping ring to thereby cause the three or more second jaws to move radially inwardly into contact with the replacement spindle; inserting the two or more alignment rods of the axle clamp assembly into the corresponding receivers of the spindle clamp assembly; sliding the spindle clamp assembly toward the axle clamp assembly until the replacement spindle is aligned with the pre-existing axle; and clamping the two or more alignment rods to the corresponding receivers to prevent relative movement between the replacement spindle and the pre-existing axle.

In addition to the exemplary aspects and embodiments described above, further aspects and embodiments will become apparent by reference to the drawings and by study of the following detailed descriptions.

BRIEF DESCRIPTION OF THE DRAWINGS

Exemplary embodiments are illustrated in referenced figures of the drawings. It is intended that the embodiments and figures disclosed herein are to be considered illustrative rather than restrictive.

DESCRIPTION

Throughout the following description specific details are set forth in order to provide a more thorough understanding to persons skilled in the art. However, well known elements may not have been shown or described in detail to avoid unnecessarily obscuring the disclosure. Accordingly, the description and drawings are to be regarded in an illustrative, rather than a restrictive, sense.

One aspect of the invention provides an alignment apparatus for accurately aligning a replacement spindle with an axle shaft to facilitate repairing a damaged axle assembly. The alignment apparatus may comprise an axle clamp assembly and a spindle clamp assembly. The axle clamp assembly may be mountable to an axle shaft. The axle clamp assembly may be self-centering and self-aligning. Similarly, the spindle clamp assembly may be mountable to a spindle. The spindle clamp assembly may be self-centering and self-aligning. The axle clamp assembly may be fixable to the spindle clamp assembly. By mounting the axle clamp assembly to the axle shaft, mounting the spindle clamp assembly to the spindle and fixing the axle clamp assembly to the spindle clamp assembly, a desired alignment between the axle shaft and the spindle may be achieved.

Figure 2:
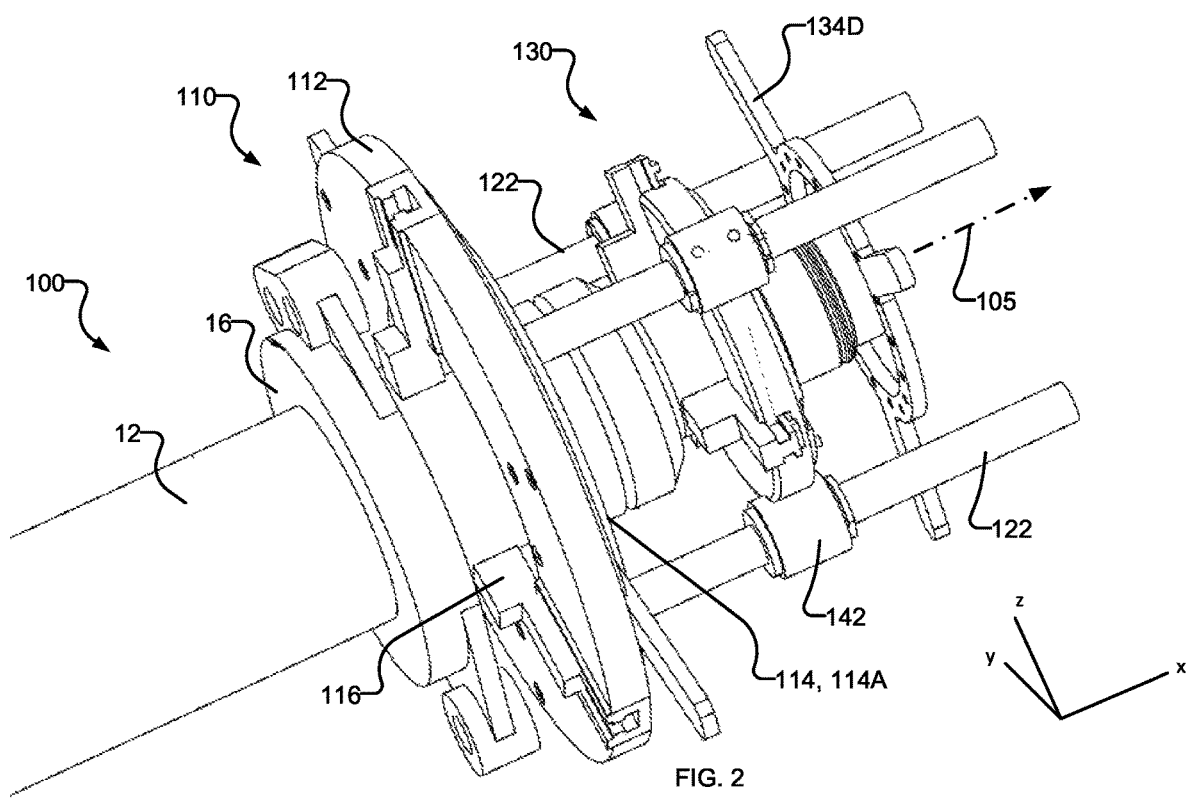
FIG. 2 is an isometric view of an alignment apparatus according to one embodiment of the invention.

FIG. 2 depicts an alignment apparatus 100 for accurately aligning a replacement spindle with an axle shaft to facilitate repairing a damaged axle assembly according to an exemplary non-limiting embodiment of the invention. Alignment apparatus 100 comprises an axle clamp assembly 110 and a spindle clamp assembly 130. For ease of description, alignment apparatus 100 may be described relative to a notional axis 105 which extends in the x-direction as shown in the drawings. Axis 105 may extend in the same directions as axle shaft 112.

Figure 3:
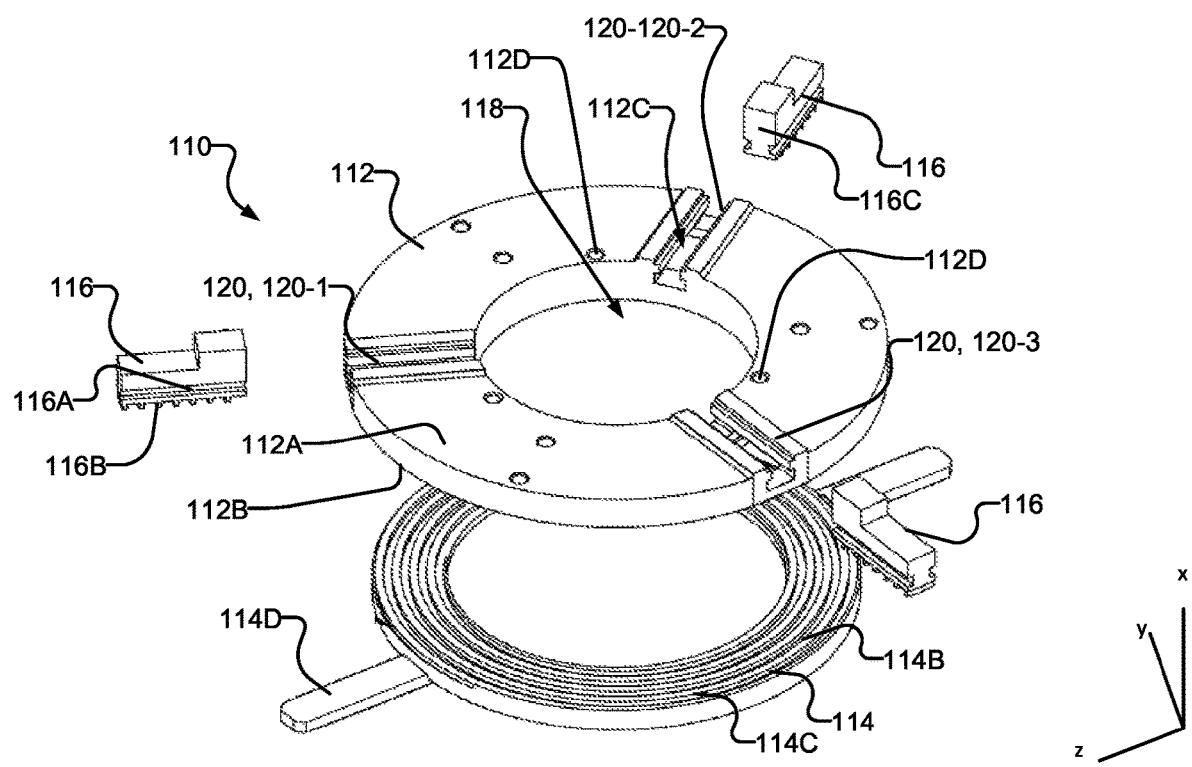
FIG. 3 is an exploded view of a portion of an axle clamp assembly according to one embodiment of the invention.

Axle clamp assembly 110 is releasably clampable to an axle shaft 12. Axle clamp assembly comprises a chuck body 112, a spiral clamping ring 114 (also referred to herein as an "axle moveable element") and three or more jaws 116 (e.g. first jaw 116-1, second jaw 116-2 and third jaw 116-3) as shown in FIG. 3. Together, spiral clamping ring 114 and jaws 116 may be referred herein to as an "axle clamping mechanism".

Chuck body 112 may have an annular shape that defines an opening 118 (about axis 105) for receiving axle shaft 12. A first side 112A of chuck body 112 may define three or more slots 120 (e.g. first slot 120-1, second slot 120-2 and third slot 120-3). A longitudinal axis of each slot 120 may be aligned with a corresponding radial direction 6 (e.g. a direction pointing toward or away from axis 105 at the center of annular chuck body 112 as shown in FIG. 4). Slots 120 may be circumferentially spaced apart around opening 118 and axis 105. In some embodiments, adjacent slots 120 circumferentially spaced apart around opening 118 and axis 105 at equidistant angular intervals. For example, in the illustrated embodiment, where there are three slots 120 as best seen in FIG. 4A, slots 120 may be spaced apart from one another about axis 105 at angular increments of 120°.

Each slot 120 may correspond to (and may slidably receive) one of the three or more jaws 116. Each slot 120 may comprise one or more rails 120A, as shown schematically in FIG. 4B. In the illustrated embodiment, rails 120A are convex and extend in circumferential directions and in a corresponding radial direction 6. Rails 120A may be slidably receivable in complementary concave tracks 116A of jaws 116 (see FIG. 3) to allow jaws 116 to slidably translate in their corresponding radial directions 6 when jaws 116 are received in their corresponding slots 120. The interaction between rails 120A and tracks 116A may allow for translation of jaws 116 in their corresponding radial directions 6 with respect to chuck body 112, while preventing or at least mitigating other undesired relative movement of jaws 116 with respect to chuck body 112. In some embodiments, jaws 116 may be provided with convex rails and slots 120 may be provided with concave rails to permit similar radial motion of jaws 116 with respect to chuck body 112 while mitigating other undesired movement of jaws 116 with respect to chuck body 112. In some embodiments, jaws 116 are otherwise slidably coupled to slots 120 to facilitate this constrained movement.

Figure 4A:
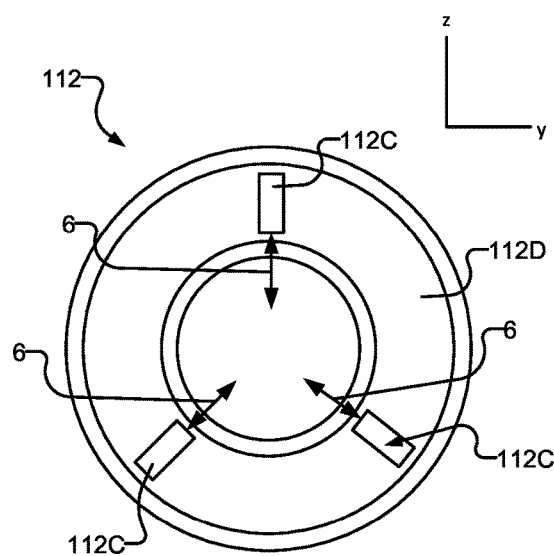
FIG. 4A is schematic plan view depiction of a chuck body according to one embodiment of the invention.
Figure 4B:
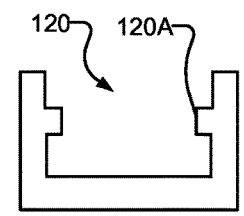
FIG. 4B is a schematic plan view depiction of a slot according to one embodiment of the invention.

Chuck body 112 may be shaped to define three or more apertures 112C, as shown in FIG. 4A. Each aperture 112C may pass through chuck body 112 from first side 112A of chuck body 112 to a second side 112B of chuck body 112—e.g. in the x-direction. Apertures 112C may be located in (e.g. in the bases of) slots 120.

Second side 112b of chuck body 112 may define an annular-shaped recess 112D (as shown in FIG. 4A) for receiving spiral clamping ring 114 (FIG. 3). Inner and outer diameters of annular-shaped recess 112D may be sized to match inner and outer diameters of spiral clamping ring 114. An x-direction depth of annular recess 112D may be less than an x-direction depth of spiral clamping ring 114, such that when spiral clamping ring 114 is received in annular recess 112D, a portion 114A (shown in FIG. 2) of spiral clamping ring 114 may protrude out of annular recess 112D in the x-direction.

Spiral clamping ring 114 may comprise a spiral track 114B shown best in FIG. 3.

Grooves 114C of spiral track 114B may be shaped and sized to mate with teeth 116B (FIG. 3) of jaws 116.

When spiral clamping ring 114 is received within annular recess 112C, at least a portion of spiral track 114 may protrude (in the x-direction) through each aperture 112C and into slots 120. As such, when jaws 116 are positioned in slots 120 and spiral clamping ring 114 is received in annular recess 112C, grooves 114C of spiral track 114b may mate with teeth 116B of jaws 116.

One or more handles 114D may extend (e.g. radially) from spiral clamping ring 114 to help apply torque which will tend to rotate spiral clamping ring 114 in circumferential directions about axis 105. Handle 114D may be shaped and/or located such that when spiral clamping ring 114 is received in annular recess 112D, handle 114D does not interfere with rotation of spiral clamping ring 114 relative to chuck body 112. For example, handle 114D may extend from portion 114A of spiral clamping ring 114.

Although not depicted in FIG. 3, axle clamp assembly 110 may comprise a plurality of alignment rods 122. For example, as shown in FIG. 2, axle clamp assembly 110 may comprise three alignment rods 122. Alignment rods 122 may protrude from chuck body 112 in the x-direction (i.e. parallel to axis 105). Some embodiments, this direction may be orthogonal (or substantially orthogonal) to first and second sides 112A, 112b of chuck body 112.

Figure 6:
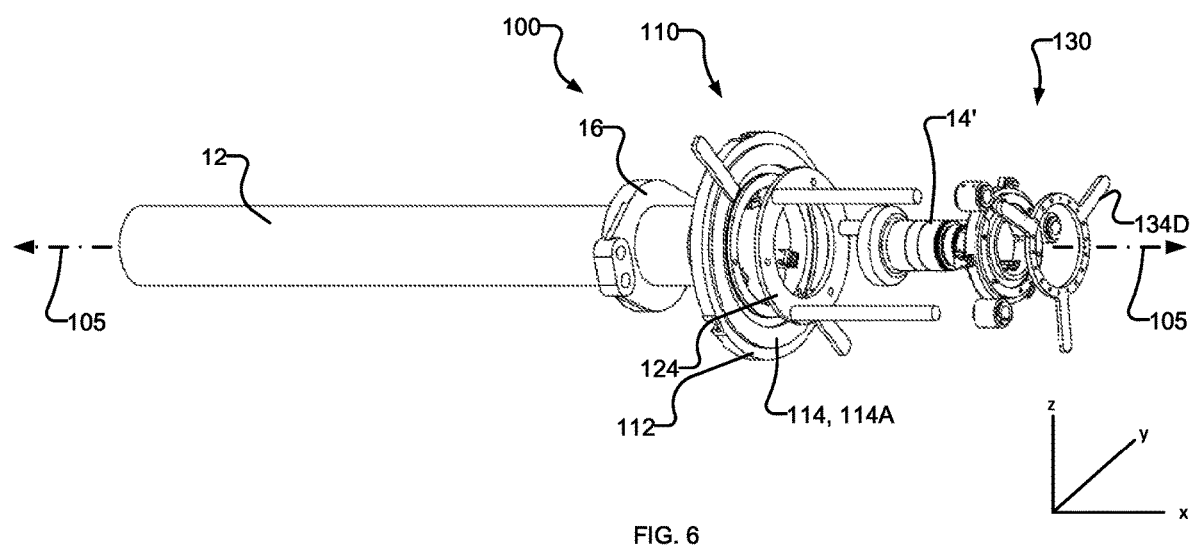
FIG. 6 is an exploded view of a portion of an alignment apparatus being installed on an axle and a replacement spindle according to one embodiment of the invention.

In some embodiments, alignment rods 122 are attached directly to chuck body 112. In some embodiments, alignment rods 122 are secured to a plate 124 that is in turn attached to chuck body 112, as shown in FIG. 6. For example, plate 124 may be attached to chuck body 112 by one or more fasteners (e.g. bolts, threaded studs or the like with corresponding nuts) which may extend from alignment rods 122, through apertures 112D in chuck body 112 and through corresponding apertures (not expressly enumerated) in plate 124. In some embodiments, spiral clamping ring 114 is sandwiched between chuck body 112 and plate 124. In this way, plate 124 may prevent spiral clamping ring 114 from undesirably moving in the x- (axial-) direction.

Figure 5:
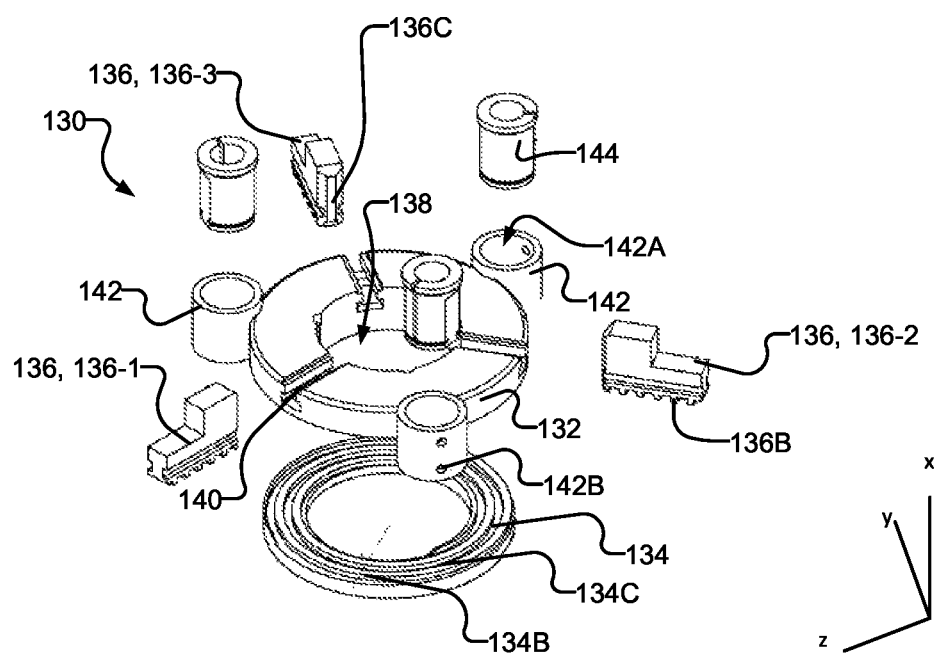
FIG. 5 is an exploded view of a portion of a spindle clamp assembly according to one embodiment of the invention.

FIG. 5 shows an exploded view of a spindle clamp assembly 130 according to one exemplary non-limiting embodiment. Spindle clamp assembly 130 is releasably clampable to a spindle 14. Spindle clamp assembly 130 is similar in many respects to axle clamp assembly 110. For example, spindle clamp assembly 130 comprises a chuck body 132 similar to chuck body 112, a spiral clamping ring 134 (also referred to herein as a "spindle moveable element") similar to spiral clamp ring 114 and three or more jaws 136 (e.g. first jaw 136-1, second jaw 136-2 and third jaw 136-3) receivable in three or more corresponding slots 140 similar to jaws 116 and slots 120. Together, spiral clamping ring 134 and jaws 134 may be referred herein to as a "spindle clamping mechanism". For the sake of brevity, this description focuses primarily on the differences between spindle clamp assembly 130 and axle clamp assembly 110.

Spindle clamp assembly 130 differs from axle clamp assembly 110 in that chuck body 132 does not include alignment rods but instead comprises two or more receivers 142 for receiving corresponding alignment rods 122 from axle clamp assembly. For example, chuck body 132 may comprise three receivers 142, as shown in FIG. 4. In some embodiments, an interior cavity 142A of each receiver 142 is complementary in size to an external diameter of a corresponding alignment rod 122. In some embodiments, compression sleeves 144 are provided to achieve a desired fit between receivers 142 and their corresponding alignment rod 122. Compression sleeve 144 may assist in achieving a desired fit between an alignment rod 122 and a corresponding receiver 142 and may prevent damage to the alignment rod 122.

Receivers 142 may each comprise one or more set screws (not expressly shown) which may project through aperture 142B into interior cavity 142A. Such set screws may be employed to clamp an alignment rod 122 that has been inserted into cavity 142A of receiver 142 in place. In some embodiments, such set screws may be employed to deform compression sleeve 144 to thereby clamp an alignment rod 122 that has been inserted into receiver 142 in place. Compression sleeve 144 may be slotted to prevent damage to compression sleeve 144 and/or alignment rod 122 when alignment rod 122 is clamped by the set screws. In some embodiments, additional or alternative fastening mechanisms may be used to clamp alignment rods 122 that have been received in receivers 142.

While alignment rods 122 and receivers 142 are shown as having circular cross-sections (e.g. in a cross-sectional plane that extends in the y and z-directions), it should be understood that this is not necessary and each alignment rod 122 can have any cross-section that is complementary to a corresponding receiver 142 (or a compression sleeve 144 insertable into a corresponding receiver 142).

It will be appreciated that in some embodiments, alignment rods 122 may be fastened to, or otherwise configured to extend from, spindle clamp assembly 130 and axle clamp assembly 110 may be provided with suitable receivers to receive and clamp to alignment rods 122.

Unlike spiral clamping ring 114, where a handle 114D may be integral or fixed to spiral clamping ring 114 (this is not mandatory), spiral clamping ring 134 may comprise a detachable handle 134D. Detachable handle 134D may releasably attach to spiral clamping ring 134 using any suitable hardware. Detaching handle 134D may facilitate avoiding interference of handle 134D with alignment rods 122 when alignment rods 122 are inserted into receivers 142.

Figure 8A:
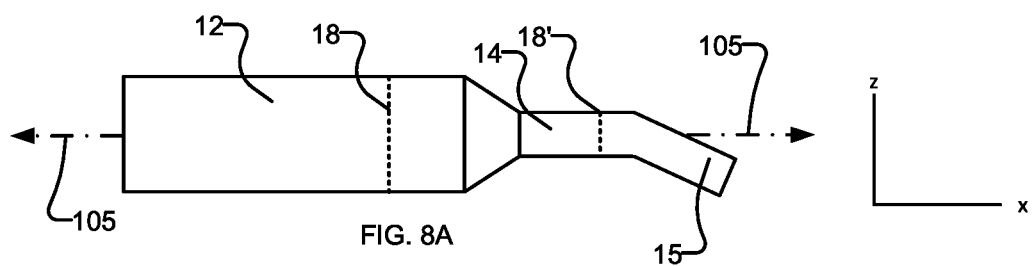
FIG. 8A is a schematic depiction of a damaged spindle.
Figure 8B:
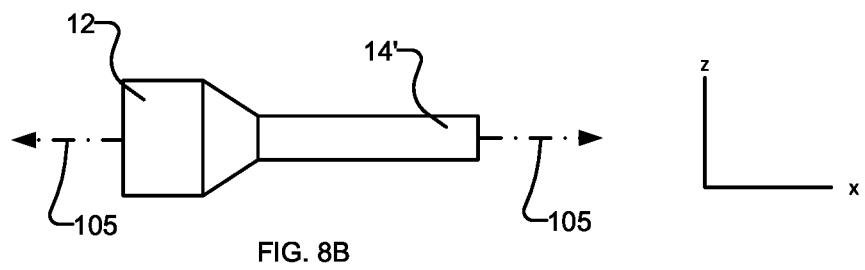
FIG. 8B is a schematic depiction of a replacement spindle according to one embodiment of the invention.

In practice, when a spindle 14 is damaged, a damaged portion 15 of spindle 14 (as shown in FIG. 8A) may be removed and replaced with a replacement spindle 14' (as shown in FIG. 8B). Damaged portion 15 of spindle 14 may be removed using a suitable cutting tool by cutting axle shaft 12 (e.g. by cutting at cut line 18) and removing a portion of the undamaged axle and the entire spindle 14. If only a portion of spindle 14 is damaged (e.g. as depicted in FIG. 8), the damaged portion 15 of spindle 14 may be cut off without cutting axle shaft 12 (e.g. by cutting at cut line 18'). In either case (where axle shaft 12 is cut or where spindle 14 is cut), it should be understood that the subsequent steps to repair or replace damaged portion 15 of spindle 14 are similar or substantially the same.

When axle clamp assembly 110 is assembled with jaws 116 arranged in slots 120 and spiral clamping ring 114 in annular recess 112C, rotation of spiral clamping ring 114 (e.g. by moving handle 114D about axis 105) causes movement of jaws 116 in their corresponding radial directions 6 (relative to chuck body 112) due to the interaction between grooves 114C of spiral track 114B with teeth 116B of jaws 116. For example, clockwise rotation of spiral clamping ring 114 about axis 105 may cause clamping surface 116C of each jaw 116 to move inwardly in its corresponding axial direction 6 toward opening 118 and/or toward axis 105, while counter-clockwise rotation of spiral clamping ring 114 about axis 105 may cause clamping surface 116C of each jaw 116 to move outwardly in its corresponding radial direction 6 away from opening 118 and/or away from axis 105. Since teeth 116B of each jaw 116 interact with spiral track 114B in the same way and at the same time, such radial inward/outward movement of jaws 116 due to their interaction with spiral clamping ring 114 causes substantially equal radial movement (e.g. substantially equal in magnitude and speed) of each jaw 116 relative to chuck body 112. As such, by inserting axle shaft 12 through opening 118 and rotating spiral clamping ring 114 (e.g. by moving handle 114D about axis 105), clamping surfaces 116C of jaws 116 can be caused to contact axle shaft 12 thereby clamping axle clamp assembly 110 to axle shaft 12.

Figure 7:
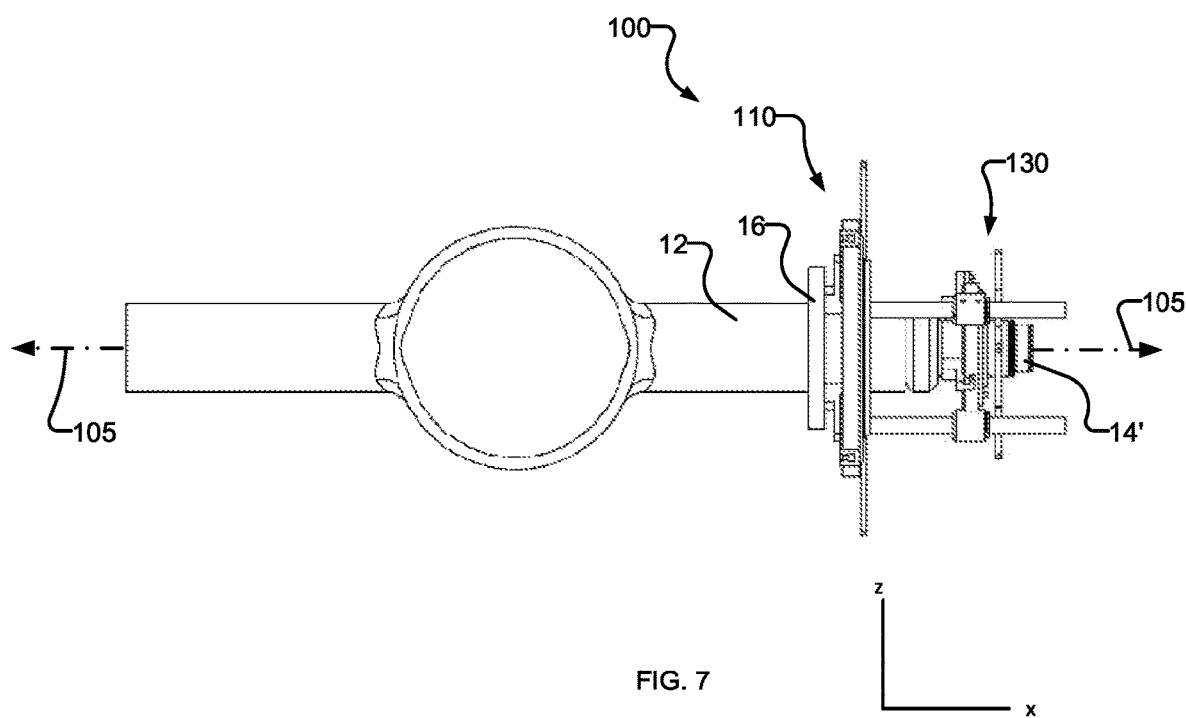
FIG. 7 is a top view of an alignment apparatus installed on an axle to align a replacement spindle according to one embodiment of the invention.

Axle clamp assembly 110 may be clamped to axle shaft 12 at any desirable location. In some embodiments, axle clamp assembly 110 is clamped to axle shaft 12 at a location spaced apart (in the x-direction or the direction of axis 105) from a brake flange (or brake spider) 16. In some embodiments, axle clamp assembly 110 is clamped to axle shaft 12 at a location adjacent to a brake flange (or brake spider) 16 such that jaws 116 abut against brake flange (or brake spider) 16, as shown in FIG. 7. In some circumstances, axle clamp assembly 110 may be clamped directly onto an outer circumferential surface 16A of a brake flange (or brake spider) 16.

Since jaws move radially inwardly/outwardly with substantially equal magnitude and speed, axle shaft 12 is automatically centered within opening 118 by the operation of axle clamp assembly 110 when jaws 116 of axle clamp assembly 110 clamp onto axle shaft 12 (or brake flange 16). Further, since clamping surface 116C of each jaw 116 is shaped to be generally orthogonal to the radial direction of movement of that jaw 116 (i.e. to have a normal vector that is generally parallel to radial direction of movement of that jaw 116), chuck body 112 is automatically oriented orthogonally to the direction of elongation of axle shaft 12 (e.g. the x-direction along axis 105) when jaws 116 of axle clamp assembly 110 clamp onto axle shaft 12. Because of the automatic centering of axle shaft 12 in opening 118 and the automatic orientation of chuck body 112 relative to axle shaft 12 caused by the mechanism of axle clamp assembly 110, additional measuring devices, alignment devices and/or clamps are not required to achieve alignment of axle clamp assembly 110 with axle 12 when axle clamp assembly 110 clamps onto axle shaft 12. This allows for easy, consistent and reliable alignment of axle clamp assembly 110 on axle 12.

Similarly, when spindle clamp assembly 130 is assembled, rotation of spiral clamping ring 134 (e.g. by moving handle 134D about the axis of spindle clamp assembly 130) causes radial direction movement of jaws 136 (relative to chuck body 132) due to the interaction between grooves 134C of spiral track 134B with teeth 136B of jaws 136. For example, clockwise rotation of spiral clamping ring 134 about the axis of spindle clamp assembly 130 may cause clamping surfaces 136C of jaws 136 to move radially inward toward opening 138 and/or toward the axis of spindle clamp assembly 130, while counter-clockwise rotation of spiral clamping ring 134 about the axis of spindle clamp assembly 130 may cause clamping surfaces 136C of jaws 136 to move radially outward away from opening 138 and/or away from the axis of spindle clamp assembly 130. Since teeth 136B of each jaw 136 interact with spiral track 134B in the same way and at the same time, such radial inward/outward movement of jaws 136 due to the interaction with spiral clamping ring 134 causes substantially equal radial movement (e.g. substantially equal in magnitude and speed) of each jaw 136. As such, by inserting replacement spindle 14' through opening 138 and rotating spiral clamping ring 134 (e.g. by moving handle 134D about the axis of spindle clamp assembly 130), clamping surfaces 136C of jaws 136 can be caused to contact replacement spindle 14' thereby clamping spindle clamp assembly 130 to replacement spindle 14'.

Since jaws 136 move radially inwardly/outwardly with substantially equal magnitude and speed, replacement spindle 14' is automatically centered within opening 138 when jaws 136 of spindle clamp assembly 130 clamp onto replacement spindle 14'. Further, since clamping surface 136C of each jaw 136 is shaped to be generally orthogonal to the radial direction of movement of that jaw 136 (i.e. to have a normal vector that is generally parallel to radial direction of movement of that jaw 136), chuck body 132 is automatically oriented orthogonally to the direction of elongation of replacement spindle 14' (e.g. the direction of the axis of spindle clamp assembly 130) when jaws 136 of spindle clamp assembly 130 clamp onto replacement spindle 14'. Because of the automatic centering of replacement spindle 14' in opening 138 and the automatic orientation of chuck body 132 relative to replacement spindle 14' caused by the mechanism of spindle clamp assembly 130, additional measuring devices, alignment devices and/or clamps are not required to achieve alignment of spindle clamp assembly 130 with replacement spindle 14' when spindle clamp assembly 130 clamps onto replacement spindle 14'. This allows for easy, consistent, reliable alignment of spindle clamp assembly 130 with replacement spindle 14'.

Figure 1:
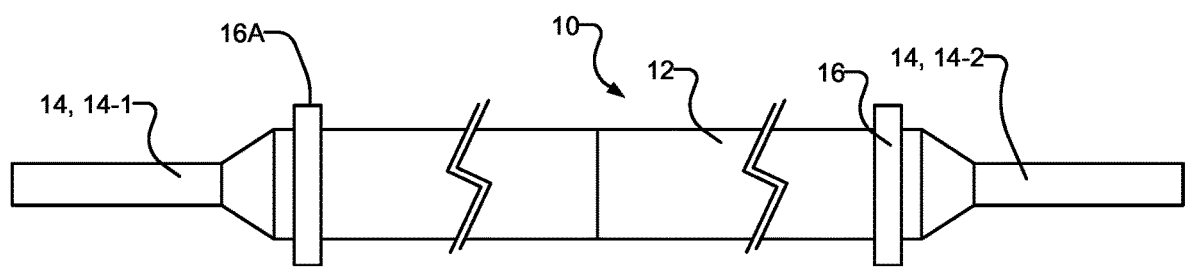
FIG. 1 is a schematic depiction of a prior art axle assembly.

Once axle clamp assembly 110 is clamped to axle shaft 12 and spindle clamp assembly 130 is clamped to replacement spindle 14', alignment rods 122 may be inserted into receivers 142, as shown in FIG. 1. In some embodiments, handle 134D may be removed prior to insertion of alignment rods 122 into receivers 142. Interaction between alignment rods 122 and receivers 142 may prevent relative translational movement between axle shaft 12 and replacement spindle 14' in the y and z-directions and/or relative rotational movement about x, y and z direction axes—that is there is only one remaining degree of freedom and that is in the x-direction (i.e. the direction of axis 105). When replacement spindle 14' is sufficiently close to cut line 18 of axle shaft 12, set screws 142B may be tightened thereby also preventing relative movement between axle shaft 12 and spindle 14 in the x-direction (i.e. the direction of axis 105).

With relative movement between axle shaft 12 and replacement spindle 14' prevented or generally limited, replacement spindle 14' may be welded to axle shaft 12 (e.g. at cut line 18 or 18', as appropriate). In some embodiments, replacement spindle 14' is only partially welded (e.g. spot welded) to axle shaft 12 to prevent any relative movement between axle shaft 12 and spindle 14 if axle clamp assembly 110 and/or spindle clamp assembly 130 is removed. Welding of spindle 14 to axle shaft 12 may then be finished after axle clamp assembly 110 and/or spindle clamp assembly 130 is removed.

Interpretation of Terms

Unless the context clearly requires otherwise, throughout the description and the
- "comprise", "comprising", and the like are to be construed in an inclusive sense, as opposed to an exclusive or exhaustive sense; that is to say, in the sense of "including, but not limited to";
- "connected", "coupled", or any variant thereof, means any connection or coupling, either direct or indirect, between two or more elements; the coupling or connection between the elements can be physical, logical, or a combination thereof; elements which are integrally formed may be considered to be connected or coupled;
- "herein", "above", "below", and words of similar import, when used to describe this specification, shall refer to this specification as a whole, and not to any particular portions of this specification;

"or", in reference to a list of two or more items, covers all of the following interpretations of the word: any of the items in the list, all of the items in the list, and any combination of the items in the list;

the singular forms "a", "an", and "the" also include the meaning of any appropriate plural forms.

Words that indicate directions such as "vertical", "transverse", "horizontal", "upward", "downward", "forward", "backward", "inward", "outward", "vertical", "transverse", "left", "right", "front", "back", "top", "bottom", "below", "above", "under", and the like, used in this description and any accompanying claims (where present), depend on the specific orientation of the apparatus described and illustrated. The subject matter described herein may assume various alternative orientations. Accordingly, these directional terms are not strictly defined and should not be interpreted narrowly.

Although the operations of the method(s) herein are shown and described in a particular order, the order of the operations of each method may be altered so that certain operations may be performed in an inverse order or so that certain operation may be performed, at least in part, concurrently with other operations. In another embodiment, instructions or sub-operations of distinct operations may be in an intermittent and/or alternating manner.

Where a component (e.g. a cup, container, etc.) is referred to above, unless otherwise indicated, reference to that component (including a reference to a "means") should be interpreted as including as equivalents of that component any component which performs the function of the described component (i.e. that is functionally equivalent), including components which are not structurally equivalent to the disclosed structure which performs the function in the illustrated exemplary embodiments of the invention.

Specific examples of systems, methods and apparatus have been described herein for purposes of illustration. These are only examples. The technology provided herein can be applied to systems other than the example systems described herein. Many alterations, modifications, additions, omissions, and permutations are possible within the practice of this invention. This invention includes variations on described embodiments that would be apparent to the skilled addressee, including variations obtained by: replacing features, elements and/or acts with equivalent features, elements and/or acts; mixing and matching of features, elements and/or acts from different embodiments; combining features, elements and/or acts from embodiments as described herein with features, elements and/or acts of other technology; and/or omitting combining features, elements and/or acts from described embodiments.

Various features are described herein as being present in "some embodiments". Such features are not mandatory and may not be present in all embodiments. Embodiments of the invention may include zero, any one or any combination of two or more of such features. This is limited only to the extent that certain ones of such features are incompatible with other ones of such features in the sense that it would be impossible for a person of ordinary skill in the art to construct a practical embodiment that combines such incompatible features. Consequently, the description that "some embodiments" possess feature A and "some embodiments" possess feature B should be interpreted as an express indication that the inventors also contemplate embodiments which combine features A and B (unless the description states otherwise or features A and B are fundamentally incompatible).

The invention has a number of non-limiting aspects. Non-limiting aspects of the invention include, without limitation.

1. A vehicular axle alignment apparatus for aligning a first axle component with a second axle component, the alignment apparatus comprising:
   an axle clamp assembly comprising:
      an axle chuck body defining an axle opening for receiving the first axle component extending in a first axial direction therethough;
      an axle clamping mechanism comprising an axle moveable element and three or more axle jaws,
         the three or more axle jaws angularly spaced apart about an axle axis that extends through a center of the axle opening in the first axial direction;
         the three or more axle jaws moveably coupled to the axle moveable element such that movement of the axle moveable element relative to the axle chuck body causes corresponding movement of the three or more axle jaws relative to the axle chuck body in corresponding directions toward or away from the axle axis;
   a spindle clamp assembly comprising:
      a spindle chuck body defining a spindle opening for receiving the second axle component extending in a second axial direction therethough;
      a spindle clamping mechanism comprising a spindle moveable element and three or more spindle jaws,
         the three or more spindle jaws angularly spaced apart about a spindle axis that extends through a center of the spindle opening in the second axial direction;
         the three or more spindle jaws moveably coupled to the spindle moveable element such that movement of the spindle moveable element relative to the spindle chuck body causes corresponding movement of the three or more spindle jaws relative to the spindle chuck body in corresponding directions toward or away from the spindle axis;
   a plurality of alignment rods extending from one of the axle clamp assembly and the spindle clamp assembly and releasably coupleable to the other one of the axle clamp assembly and the spindle clamp assembly at corresponding locations spaced apart from the axle axis and the spindle axis such that when the alignment rods are coupled at the corresponding locations, the axle axis and the spindle axis are aligned to be coaxial along a common axis and the alignment rods extend between the axle clamp assembly and the spindle clamp assembly in directions parallel to the common axis.

2. A vehicular axle alignment apparatus according to aspect 1, wherein the first axle element is a portion of a vehicle axle attached to a vehicle and the portion of the vehicle axle is extendible through the axle opening in the first axial direction while the vehicle axle is attached to the vehicle.

3. A vehicular axle alignment apparatus according to aspect 1 wherein an amount of the movement of each of the three or more axle jaws in response to a given movement of the axle moveable element is substantially equal.

4. A vehicular axle alignment apparatus according to aspect 3 wherein an amount of the movement of each of the three or more spindle jaws in response to a given movement of the spindle moveable element is substantially equal.
5. A vehicular axle alignment apparatus according to aspect 1 wherein the three or more axle jaws are moveably coupled to the axle movable element, such that movement of the axle movable element causes corresponding movement of the three or more axle jaws in corresponding radial directions toward or away from the axle axis.
6. A vehicular axle alignment apparatus according to aspect 5 wherein the three or more spindle jaws are moveably coupled to the spindle movable element, such that movement of the spindle movable element causes corresponding movement of the three or more spindle jaws in corresponding radial directions toward or away from the spindle axis.
7. A vehicular axle alignment apparatus according to aspect 6 wherein the three or more axle jaws are slidably received in corresponding axle jaw slots defined by the axle chuck body to allow movement of the three or more axle jaws in corresponding radial directions toward or away from the axle axis.
8. A vehicular axle alignment apparatus according to aspect 7 wherein the three or more spindle jaws are slidably received in corresponding spindle jaw slots defined by the spindle chuck body to allow movement of the three or more spindle jaws in corresponding radial directions toward or away from the spindle axis.
9. A vehicular axle alignment apparatus according to aspect 8 wherein one of the three or more axle jaws and the corresponding axle jaw slots comprise first tracks for receiving corresponding first rails of the other one of the three or more axle jaws and the corresponding axle jaw slots, wherein interaction of the first tracks with the first rails prevents movement of the three or more axle jaws in directions other than their corresponding radial directions toward or away from the axle axis.
10. A vehicular axle alignment apparatus according to aspect 9 wherein one of the three or more spindle jaws and the corresponding spindle jaw slots comprise second tracks for receiving corresponding second rails of the other one of the three or more spindle jaws and the corresponding spindle jaw slots, wherein interaction of the second tracks with the second rails prevents movement of the three or more spindle jaws in directions other than their corresponding radial directions toward or away from the spindle axis.
11. A vehicular axle alignment apparatus according to aspect 1 wherein the three or more axle jaws are equally angularly spaced apart about the axle axis.
12. A vehicular axle alignment apparatus according to aspect 1 wherein the three or more spindle jaws are equally angularly spaced apart about the spindle axis.
13. A vehicular axle alignment apparatus according to aspect 1 wherein:
the axle moveable element comprises an axle ring defining an axle spirally shaped clamping track;
each of the three or more axle jaws comprise one or more axle jaw teeth engaged with the axle spirally shaped clamping track; and
when the axle ring is pivoted about the axle axis, interaction between the axle spirally shaped clamping track and the one or more axle jaw teeth of the three or more axle jaws cause the movement of the three or more axle jaws in corresponding directions toward or away from the axle axis.
14. A vehicular axle alignment apparatus according to aspect 13 wherein sufficient movement of the three or more axle jaws in corresponding directions toward the axle axis cause the three or more axle jaws to clamp the first axle component between the three or more axle jaws.
15. A vehicular axle alignment apparatus according to aspect 13 wherein:
the spindle moveable element comprises a spindle ring defining a spindle spirally shaped clamping track;
each of the three or more spindle jaws comprise one or more spindle jaw teeth engaged with the spindle spirally shaped clamping track; and
when the spindle ring is pivoted about the spindle axis, interaction between the spindle spirally shaped clamping track and the one or more spindle jaw teeth of the three or more spindle jaws cause the movement of the three or more spindle jaws in corresponding directions toward or away from the spindle axis.
16. A vehicular axle alignment apparatus according to aspect 15 wherein sufficient movement of the three or more spindle jaws in corresponding directions toward the spindle axis cause the three or more spindle jaws to clamp the second axle component between the three or more spindle jaws.
17. A vehicular axle alignment apparatus according to aspect 1 wherein the movement of each of the three or more axle jaws in response to a given movement of the axle moveable element is substantially simultaneous.
18. A vehicular axle alignment apparatus according to aspect 17 wherein the movement of each of the three or more spindle jaws in response to a given movement of the spindle moveable element is substantially simultaneous.
19. A vehicular axle alignment apparatus according to aspect 15 wherein the axle chuck body is shaped to define three or more apertures, through which the axle spirally shaped clamping track of the axle ring engages the one or more axle jaw teeth of the three or more axle jaws.
20. A vehicular axle alignment apparatus according to aspect 19 wherein the spindle chuck body is shaped to define three or more apertures, through which the spindle spirally shaped clamping track of the spindle ring engages the one or more spindle jaw teeth of the three or more spindle jaws.
21. A vehicular axle alignment apparatus according to aspect 1 wherein the releasable couplings between the plurality of alignment rods and the other one of the axle clamp assembly and the spindle clamp assembly comprise coupling mechanisms that are convertible between:
a first coupled state where the axle axis and the spindle axis are maintained to be coaxial along the common axis, the alignment rods extend between the axle clamp assembly and the spindle clamp assembly in directions parallel to the common axis and a distance between the axle clamp assembly and the spindle clamp assembly is adjustable in a direction parallel to the common axis; and
a second coupled state where the axle axis and the spindle axis are maintained to be coaxial along the common axis, the alignment rods extend between the axle clamp assembly and the spindle clamp assembly in directions parallel to the common axis and the distance between the axle clamp assembly and the spindle clamp assembly in the direction parallel to the common axis is fixed.

22. A vehicular axle alignment apparatus according to aspect 21 wherein, in the first coupled state, each of the alignment rods protrudes through a bore defined by a corresponding receiver at one of the corresponding locations on the other one of the axle clamp assembly and the spindle clamp assembly, the bore extending in one of the directions parallel to the common axis.

23. A vehicular axle alignment apparatus according to aspect 22 wherein, in the second coupled state, a coupling element protrudes into the bore of each receiver to bear against the alignment rod and to thereby prevent movement of the alignment rod through the bore in the one of the directions parallel to the common axis.

24. A spindle alignment apparatus for aligning a replacement spindle with a pre-existing axle, the spindle alignment apparatus comprising:
an axle clamp assembly comprising:
a first chuck body defining a first opening for receiving an axle shaft;
a first spiral clamping ring defining a first spiral clamping track;
three or more first jaws, each first jaw comprising one or more first teeth engaged with the first spiral clamping track; and
two or more alignment rods protruding from the axle clamp assembly;
wherein interaction between the first spiral clamping track and the one or more first teeth upon rotation of the first spiral clamping ring causes radial direction movement of each of the three or more first jaws into the first opening to clamp the axle shaft between the three or more first jaws;
a spindle clamp assembly comprising:
a second chuck body defining a second opening for receiving the replacement spindle;
a second spiral clamping ring defining a second spiral clamping track;
three or more second jaws, each second jaw comprising one or more second teeth engaged with the second spiral clamping track;
two or more receivers for slidably receiving the two or more alignment rods;
a set screw for clamping one of the two or more alignment rods within a corresponding one of the two or more receivers to prevent movement between the axle clamp assembly and the spindle clamp assembly;
wherein interaction between the second spiral clamping track and the one or more second teeth upon rotation of the second spiral clamping ring causes radial direction movement of each of the three or more second jaws into the second opening to clamp the replacement spindle between the three or more second jaws.

25. A method of using the vehicular axle alignment apparatus of aspect 1, the method comprising:
inserting the first axle component through the axle opening;
moving the axle movable element to thereby cause the three or more axle jaws to move toward the axle axis and into contact with the first axle component;
inserting the second axle component through the spindle opening;
moving the spindle movable element to thereby cause the three or more spindle jaws to move toward the spindle axis and into contact with the second axle component; and
coupling the plurality of alignment rods to the other one of the axle clamp assembly and the spindle clamp assembly to thereby align the first and second axle components along the common axis.

26. A method for aligning a first vehicular axle component with a second vehicular axle component, the method comprising:
clamping an axle clamp assembly to an outer circumferential surface of the first vehicular axle component using an axle clamping mechanism comprising three or more axle jaws that are caused by the axle clamping mechanism to apply substantially simultaneous and equal force against the first vehicular axle component;
clamping a spindle clamp assembly to an outer circumferential surface of the second vehicular axle component using a spindle clamping mechanism comprising three or more spindle jaws that are caused by the spindle clamping mechanism to apply substantially simultaneous and equal force against the second vehicular axle component; and
releasably coupling the axle clamp assembly to the spindle clamp assembly to thereby align the first vehicular axle component and the second vehicular axle component with one another along a common axis.

While a number of exemplary aspects and embodiments have been discussed above, those of skill in the art will recognize certain modifications, permutations, additions and sub-combinations thereof. It is therefore intended that the following appended claims and claims hereafter introduced are interpreted to include all such modifications, permutations, additions and sub-combinations as are consistent with the broadest interpretation of the specification as a whole.

The invention claimed is:
1. A vehicular axle alignment apparatus for aligning a first axle component with a second axle component, the alignment apparatus comprising:
an axle clamp assembly comprising:
an axle chuck body defining an axle opening for receiving the first axle component extending in a first axial direction therethough;
an axle clamping mechanism comprising an axle moveable element and three or more axle jaws,
the three or more axle jaws angularly spaced apart about an axle axis that extends through a center of the axle opening in the first axial direction;
the three or more axle jaws moveably coupled to the axle moveable element such that movement of the axle moveable element relative to the axle chuck body causes corresponding movement of the three or more axle jaws relative to the axle chuck body in corresponding directions toward or away from the axle axis;
a spindle clamp assembly comprising:
a spindle chuck body defining a spindle opening for receiving the second axle component extending in a second axial direction therethough;
a spindle clamping mechanism comprising a spindle moveable element and three or more spindle jaws, the three or more spindle jaws angularly spaced apart about a spindle axis that extends through a center of the spindle opening in the second axial direction;

the three or more spindle jaws moveably coupled to the spindle moveable element such that movement of the spindle moveable element relative to the spindle chuck body causes corresponding movement of the three or more spindle jaws relative to the spindle chuck body in corresponding directions toward or away from the spindle axis;

a clamp for releasably attaching the axle clamp assembly to the spindle clamp assembly wherein when the axle clamp assembly is releasably attached to the spindle clamp assembly, the axle axis and the spindle axis are aligned to be coaxial along a common axis, the axle clamp assembly is fixed relative to the spindle clamp assembly and the axle clamp assembly is spaced apart from the spindle clamp assembly in the axial direction by a space.

2. A vehicular axle alignment apparatus according to claim 1, wherein the first axle element is a portion of a vehicle axle attached to a vehicle and the portion of the vehicle axle is extendible through the axle opening in the first axial direction while the vehicle axle is attached to the vehicle.

3. A vehicular axle alignment apparatus according to claim 1 wherein an amount of the movement of each of the three or more axle jaws in response to a given movement of the axle moveable element is substantially equal.

4. A vehicular axle alignment apparatus according to claim 3 wherein an amount of the movement of each of the three or more spindle jaws in response to a given movement of the spindle moveable element is substantially equal.

5. A vehicular axle alignment apparatus according to claim 1 wherein the three or more axle jaws are moveably coupled to the axle movable element, such that movement of the axle movable element causes corresponding movement of the three or more axle jaws in corresponding radial directions toward or away from the axle axis.

6. A vehicular axle alignment apparatus according to claim 5 wherein the three or more spindle jaws are moveably coupled to the spindle movable element, such that movement of the spindle movable element causes corresponding movement of the three or more spindle jaws in corresponding radial directions toward or away from the spindle axis.

7. A vehicular axle alignment apparatus according to claim 6 wherein the three or more axle jaws are slidably received in corresponding axle jaw slots defined by the axle chuck body to allow movement of the three or more axle jaws in corresponding radial directions toward or away from the axle axis.

8. A vehicular axle alignment apparatus according to claim 7 wherein the three or more spindle jaws are slidably received in corresponding spindle jaw slots defined by the spindle chuck body to allow movement of the three or more spindle jaws in corresponding radial directions toward or away from the spindle axis.

9. A vehicular axle alignment apparatus according to claim 8 wherein one of the three or more axle jaws and the corresponding axle jaw slots comprise first tracks for receiving corresponding first rails of the other one of the three or more axle jaws and the corresponding axle jaw slots, wherein interaction of the first tracks with the first rails prevents movement of the three or more axle jaws in directions other than their corresponding radial directions toward or away from the axle axis.

10. A vehicular axle alignment apparatus according to claim 9 wherein one of the three or more spindle jaws and the corresponding spindle jaw slots comprise second tracks for receiving corresponding second rails of the other one of the three or more spindle jaws and the corresponding spindle jaw slots, wherein interaction of the second tracks with the second rails prevents movement of the three or more spindle jaws in directions other than their corresponding radial directions toward or away from the spindle axis.

11. A vehicular axle alignment apparatus according to claim 1 wherein the three or more axle jaws are equally angularly spaced apart about the axle axis.

12. A vehicular axle alignment apparatus according to claim 1 wherein the three or more spindle jaws are equally angularly spaced apart about the spindle axis.

13. A vehicular axle alignment apparatus according to claim 1 wherein:

the axle moveable element comprises an axle ring defining an axle spirally shaped clamping track;

each of the three or more axle jaws comprise one or more axle jaw teeth engaged with the axle spirally shaped clamping track; and when the axle ring is pivoted about the axle axis, interaction between the axle spirally shaped clamping track and the one or more axle jaw teeth of the three or more axle jaws cause the movement of the three or more axle jaws in corresponding directions toward or away from the axle axis.

14. A vehicular axle alignment apparatus according to claim 13 wherein sufficient movement of the three or more axle jaws in corresponding directions toward the axle axis cause the three or more axle jaws to clamp the first axle component between the three or more axle jaws.

15. A vehicular axle alignment apparatus according to claim 13 wherein:

the spindle moveable element comprises a spindle ring defining a spindle spirally shaped clamping track;

each of the three or more spindle jaws comprise one or more spindle jaw teeth engaged with the spindle spirally shaped clamping track; and when the spindle ring is pivoted about the spindle axis, interaction between the spindle spirally shaped clamping track and the one or more spindle jaw teeth of the three or more spindle jaws cause the movement of the three or more spindle jaws in corresponding directions toward or away from the spindle axis.

16. A vehicular axle alignment apparatus according to claim 15 wherein sufficient movement of the three or more spindle jaws in corresponding directions toward the spindle axis cause the three or more spindle jaws to clamp the second axle component between the three or more spindle jaws.

17. A method of using the vehicular axle alignment apparatus of claim 1, the method comprising:

inserting the first axle component through the axle opening;

moving the axle movable element to thereby cause the three or more axle jaws to move toward the axle axis and into contact with the first axle component;

inserting the second axle component through the spindle opening;

moving the spindle movable element to thereby cause the three or more spindle jaws to move toward the spindle axis and into contact with the second axle component; and releasably attaching the axle clamp assembly to the spindle clamp assembly to thereby fix the first and second axle components in alignment along the common axis.

18. A vehicular axle alignment apparatus according to claim 1 wherein an axial direction dimension of the space is adjustable.

19. A spindle alignment apparatus for aligning a replacement spindle with a pre-existing axle, the spindle alignment apparatus comprising:
- an axle clamp assembly comprising:
  - a first chuck body defining a first opening for receiving an axle shaft;
  - a first spiral clamping ring defining a first spiral clamping track;
  - three or more first jaws, each first jaw comprising one or more first teeth engaged with the first spiral clamping track; and
  - wherein interaction between the first spiral clamping track and the one or more first teeth upon rotation of the first spiral clamping ring causes radial direction movement of each of the three or more first jaws into the first opening to clamp the axle shaft between the three or more first jaws;
- a spindle clamp assembly comprising:
  - a second chuck body defining a second opening for receiving the replacement spindle;
  - a second spiral clamping ring defining a second spiral clamping track;
  - three or more second jaws, each second jaw comprising one or more second teeth engaged with the second spiral clamping track;
- a clamp to prevent movement between the axle clamp assembly and the spindle clamp assembly;
- wherein interaction between the second spiral clamping track and the one or more second teeth upon rotation of the second spiral clamping ring causes radial direction movement of each of the three or more second jaws into the second opening to clamp the replacement spindle between the three or more second jaws.

20. A method for aligning a first vehicular axle component with a second vehicular axle component, the method comprising:
- clamping an axle clamp assembly to an outer circumferential surface of the first vehicular axle component using an axle clamping mechanism comprising three or more axle jaws that are caused by the axle clamping mechanism to apply substantially simultaneous and equal force against the first vehicular axle component;
- clamping a spindle clamp assembly to an outer circumferential surface of the second vehicular axle component using a spindle clamping mechanism comprising three or more spindle jaws that are caused by the spindle clamping mechanism to apply substantially simultaneous and equal force against the second vehicular axle component; and
- releasably coupling the axle clamp assembly to the spindle clamp assembly to thereby align the first vehicular axle component and the second vehicular axle component with one another along a common axis.

\* \* \* \* \*